US008458777B1

(12) United States Patent
Taylor et al.

(10) Patent No.: US 8,458,777 B1
(45) Date of Patent: Jun. 4, 2013

(54) REMOTE AUTHENTICATION LOGIN SYSTEM

(75) Inventors: Paul Wesley Taylor, Lenexa, KS (US); Joseph Edward Trawicki, Jr., Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 395 days.

(21) Appl. No.: 12/793,032

(22) Filed: Jun. 3, 2010

Related U.S. Application Data

(63) Continuation-in-part of application No. 12/767,580, filed on Apr. 26, 2010.

(51) Int. Cl.
*H04L 29/00* (2006.01)
(52) U.S. Cl.
USPC .............. 726/5; 726/2; 726/3; 726/4; 726/6

(58) Field of Classification Search
None
See application file for complete search history.

(56) References Cited

U.S. PATENT DOCUMENTS

2006/0206919 A1* 9/2006 Montgomery et al. .......... 726/2
2009/0247122 A1* 10/2009 Fitzgerald et al. ............ 455/410

* cited by examiner

*Primary Examiner* — Jeffrey Pwu
*Assistant Examiner* — Helai Salehi

(57) ABSTRACT

Embodiments of the present invention provide systems, methods, and computer-readable media for granting access to a component of a computing device in response to receiving input based on a presentation of a plurality of object coordinates on a screen of a remote device. An arrangement of objects that are referenced by a coordinate system are identified. A plurality of object coordinates of the arrangement of objects is provided to the remote device. Input is received that is based on the plurality of object coordinates. When the input provided is accurate based on the arrangement of objects, access is granted to the component of the computing device.

15 Claims, 10 Drawing Sheets

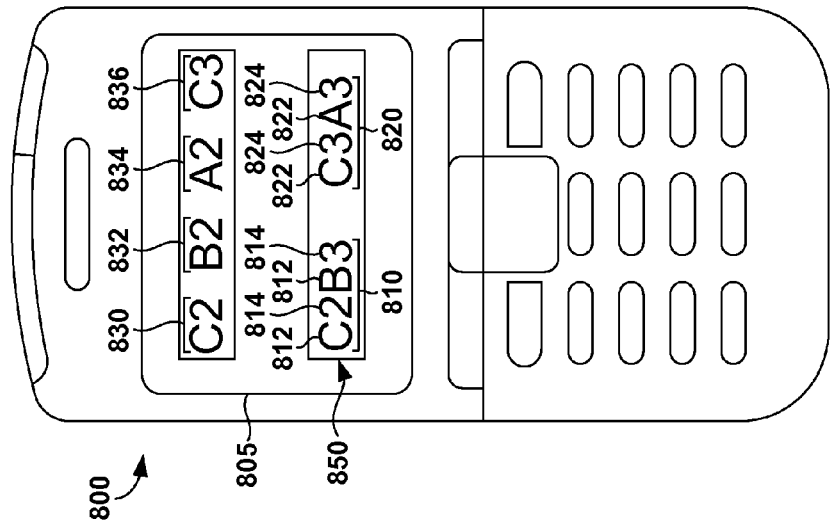
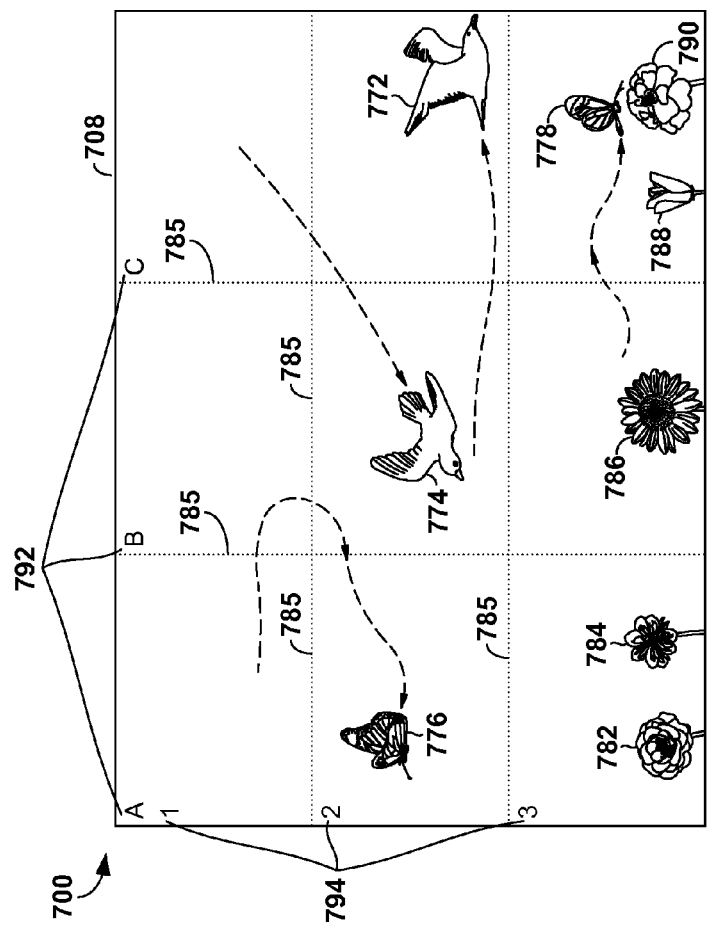
FIG. 7.
FIG. 8.

REMOTE AUTHENTICATION LOGIN SYSTEM

CROSS-REFERENCE TO RELATED APPLICATIONS

This application is a continuation-in-part of U.S. application Ser. No. 12/767,580 filed Apr. 26, 2010, and entitled "Keyboard Input Coordinate-Based Login System," which is incorporated herein by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

Many computing systems provide remote access to computing devices based on a password system. However, passwords may be easily determined and/or stolen. As such, it would be beneficial to provide an extra layer of security to access a computing device using an authentication code that is based on a plurality of object coordinates provided to be presented on a screen of a remote device. When the authentication code received from the remote device is accurate based on an arrangement of objects that includes the plurality of object coordinates, access is granted to the computing device.

In a first aspect, a set of computer-usable instructions provide a method of granting access to a component of a computing device in response to receiving input from a remote device. The input is based on a presentation of a plurality of object coordinates on a screen of the remote device. The method comprises identifying an arrangement of objects that are referenced by a coordinate system. Additionally, the method comprises providing a plurality of object coordinates to the remote device. The object coordinates are defined by the coordinate system. Further, the object coordinates are provided to be presented on the screen of the remote device. Additionally, each object coordinate is based on the arrangement of objects. The method further comprises receiving input that is based on the plurality of object coordinates presented on the screen of the remote device. The input is received at the computing device. The method also comprises granting access to the component of the computing device when the input provided is accurate based on the arrangement of objects.

In a second aspect, a set of computer-usable instructions provide a method of granting access to a component of a computing device in response to receiving input from a remote device. The input is based on a presentation of a plurality of object coordinates on a screen of the remote device. The method comprises identifying an arrangement of objects that are referenced by graphical axes of a coordinate system. Additionally, the method comprises providing a plurality of object coordinates to the remote device. The object coordinates are defined by the coordinate system. Further, the object coordinates are provided to be presented on the screen of the remote device. Additionally, each object coordinate is based on the arrangement of objects and, further, each object coordinate is mapped to at least one key of the keyboard. The method further comprises receiving input that is based on the plurality of object coordinates presented on the screen of the remote device. The input is received at the computing device. Additionally, the input includes at least one key associated with each object coordinate of the plurality of object coordinates. The method also comprises granting access to the component of the computing device when the input provided is accurate based on the arrangement of objects.

In a third aspect, a method is provided of granting access to a component of a secured device in response to receiving input from a remote device. The input is based on a presentation of a plurality of object coordinates on a screen of the remote device. The method comprises identifying an arrangement of objects that are referenced by graphical axes of a coordinate system. Additionally, the method comprises providing a plurality of object coordinates to the remote device. The object coordinates are defined by the coordinate system. Further, the object coordinates are provided to be presented on the screen of the remote device. Additionally, each object coordinate is based on the arrangement of objects and, further, each object coordinate is mapped to at least one key of the keyboard. The method further comprises receiving input that is based on the plurality of object coordinates presented on the screen of the remote device. The input is received at the secured device. Additionally, the input includes at least one key associated with each object coordinate of the plurality of object coordinates. The method also comprises granting access to the component of the secured device when the input provided is accurate based on the arrangement of objects.

BRIEF DESCRIPTION OF THE SEVERAL VIEWS OF THE DRAWINGS

Illustrative embodiments of the present invention are described in detail below with reference to the attached drawing figures, and wherein:

FIG. 7 is a schematic diagram of an arrangement of objects at a second position, the arrangement including graphical axes and graphical axis identifiers, in accordance with an embodiment of the present invention;

FIG. 8 is a schematic diagram of a remote device associated with FIG. 7, in accordance with an embodiment of the present invention;

DETAILED DESCRIPTION

Figure 1:
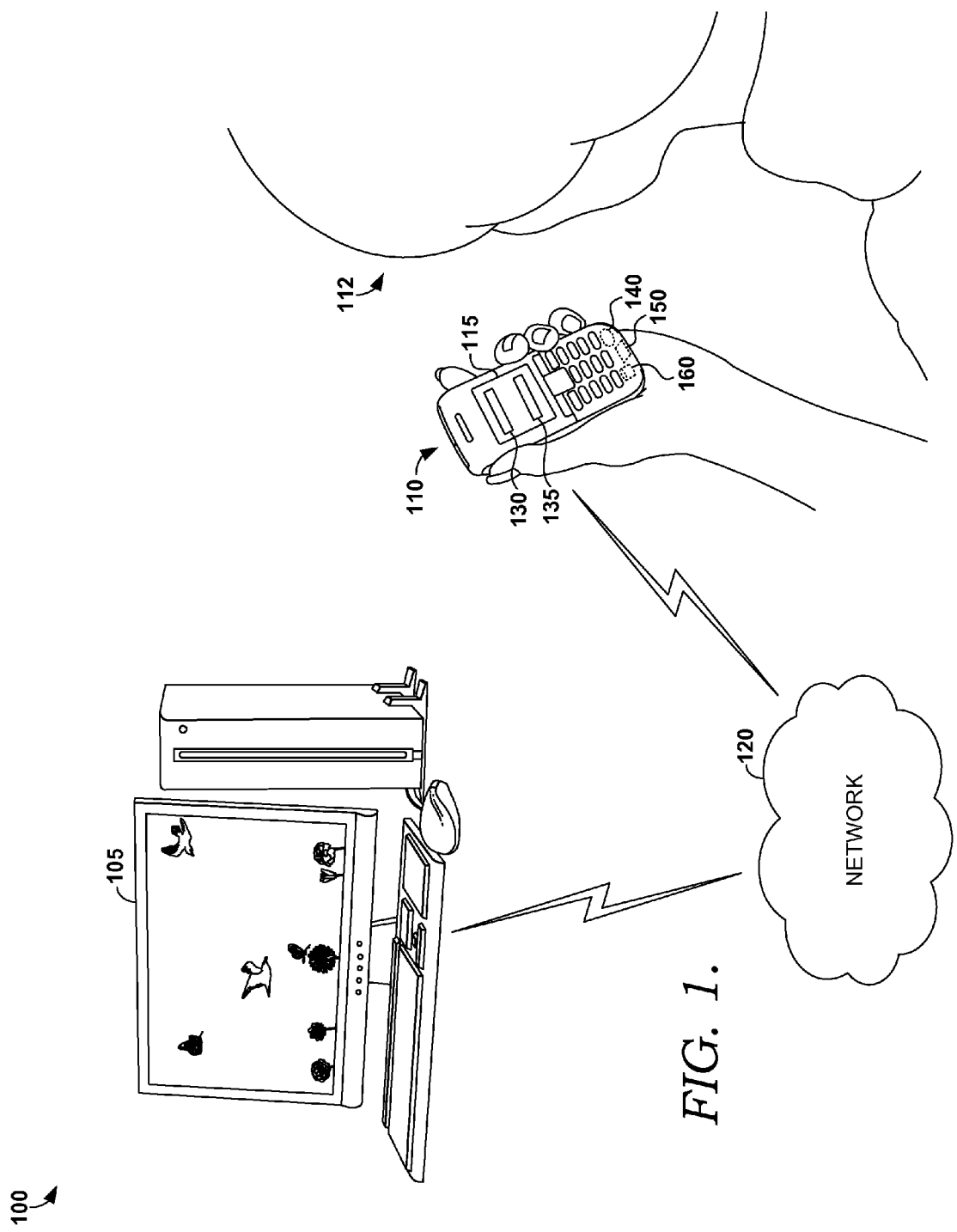
FIG. 1 is a block diagram of an exemplary system, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| LAN | Local Area Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for granting access to a component of a computing device in response to receiving a valid authentication code from a remote device. In particular, methods are provided for granting access to the component of the computing device in response to receiving a valid authentication code that indicates relationships between object coordinates based on a presentation of a plurality of object coordinates on the remote device. The plurality of object coordinates is based on an arrangement of objects that is synchronized with the plurality of object coordinates through the use of a token device. Further, the veracity of the authentication code is assessed based on relationships between object coordinates within the arrangement of objects that includes the plurality of object coordinates.

As discussed above, access to a component of a computing device may be dependent upon receiving accurate inputs, such as an accurate authentication code. In particular, the authentication code may be based on relationships between object coordinates within an arrangement of objects. The arrangement of objects may be represented by a presentation of images. For example, access to a component of a computing device may be granted in response to receiving an authentication code based on a presentation of images, as provided in Taylor, et. al., U.S. patent application Ser. No. 12/767,580, which is incorporated herein by reference.

In additional embodiments, object coordinates may be provided to a remote device. Further, users may indicate relationships between objects in the arrangement of objects by inputting object coordinates of the objects using a keyboard and/or touch pad of the remote device. For example, an arrangement of objects such as an apple, pear, and orange may be referenced using the object coordinates "A3," "B2," and "D4" of the apple, pear, and orange, respectively. Accordingly, the object coordinates of the apple, pear, and orange may be provided to the remote device. Further, an authentication code associated with the arrangement of the apple, pear, and orange may be defined based on 1) the position of the apple in relation to the position of the pear and 2) the position of the orange in relation to the position of the apple. As such, the correct authentication code based on the relationships described above is "A3-B2-D4-A3."

Additionally, the apple and pear objects may be dynamic while the orange may be static. Accordingly, an arrangement of objects that includes an apple, pear, and orange on a screen of a computing device may be referenced using the key combinations "A1," "A2," "P1," "P2," and "O1" to indicate an apple at a first and second position; a pear at a first and second position; and an orange at a first position, respectively. Additionally, the reference of the orange may be known to an authorized user in accordance with embodiments of the present invention. As such, when the user is attempting to access a component of the computing device, the computing device may only provide the remote device with the current location of the apple and the pear, as the apple and the pear are dynamic. Further, as the location of the apple and the pear changes, the plurality of object coordinates may be updated to provide the current location of the apple and the pear. For example, the current location of dynamic objects may be synchronized with the remote device using a token-based system. In contrast, the current location of the orange may not be provided to the remote device since the location of the orange is static. Accordingly, by providing a plurality of object coordinates associated with a portion of the arrangement of objects, an unauthorized user is unable to use only the plurality of objects to access a component of the computing device. Additionally, as discussed above, an authentication code associated with the presentation of the apple, pear, and orange may reference 1) the position of the apple in relation to the position of the pear and 2) the position of the orange in relation to the position of the apple. As such, if a presentation of images for a given period of time shows an apple at a first position and a pear at a second position, with the orange remaining static at its first position, respectively, the correct authentication code based on the relationships described above is "A1-P2-O1-A1."

In accordance with the second example, a user who is using an authentication code to access a component of a computing system may do so without receiving each object coordinate of the arrangement of objects. This is because, under the second example above, the plurality of object coordinates provided to the user includes a portion of the object coordinates of the arrangement of objects. In particular, the plurality of object coordinates includes references to the dynamic objects of the arrangement of objects. The static objects, however, may not be provided to the user, as the user may already know the object coordinates of static objects. In this way, if an unauthorized user attempts to access the component of the computing device, say by attempting to input an authentication code using just the object coordinates provided by the computing device, the unauthorized user may fail. For example, if an unauthorized user attempts to access a login screen to the computing device using only the object coordinates provided to the remote device by the computing device, the unauthorized user may be presented with a false login screen, e.g. a login screen that defaults to say login information received from the unauthorized user was incorrect. In this way, the authorized user may be protected from an unauthorized user gaining access to his computing device, while the unauthorized user may be left with the impression that he just input the incorrect relationship of object coordinates. By keeping an unauthorized user unaware of the extra layer of protection, the authorized user is further protected from the unauthorized user gaining unauthorized access to the authorized user's computing device.

Additionally, the object coordinates provided to a remote device to present on a screen of the remote device may differ from the object coordinates associated with an authentication code. For example, if object coordinates provided to the remote device are referenced using graphical axes identified as <A,B,C> and <1,2,3>, the correct graphical axes for referencing object coordinates for inputting an authentication code may be identified as <S,D,F> and <2,5,7>, respectively. As such, an apple, pear, and orange referenced with the object coordinates <B,2>; <C,3>; and <A,1,>, respectively, may have object coordinate inputs of <D,5>; <F,7>; and <S,2>, respectively. Further, in accordance with the example above, the correct authentication code using encrypted <letter, number> coordinates is "D-5-F-7-S-2-D-5." As such, an additional layer of security may be added to access to the component of the computing device.

Additionally, the relationship between object coordinates that serves as the basis of an authentication code may be logically dependent. For instance, when the object coordinate of a lime is provided to a remote device to be presented on the screen of the remote device in addition to the object coordinates of an apple, pear, and orange, the authentication code may be based on the relationship of the apple to the lime and the relationship of the pear to the orange. However, if the object coordinate of the lime is not presented, the authentication code may be based on the relationship of the apple to the pear and the relationship of the orange to the apple, as discussed above. As such, the veracity of an authentication code may not only depend on the arrangement of objects, but may also depend on the content of the plurality of object coordinates presented on the screen of the remote device.

Turning now to FIG. 1, a block diagram of an exemplary system is provided in accordance with an embodiment of the present invention and referenced by the numeral 100. System 100 includes a computing device 105 and a remote device 110. A device, such as computing device 105 or remote device 110, may refer to a number of different devices such as a mobile device, a cell phone, a computer, a walky-talky, or a PDA. This description does not intend to convey bright-line distinctions between the different types of devices. In embodiments, computing device 105 and remote device 110 are each a mobile device that utilizes a wireless telecommunications network to communicate. Manufacturers of illustrative mobile devices include, for example, Research in Motion® of Waterloo, Canada; Creative Technologies Corp. of Brooklyn, N.Y.; Samsung® of Seoul, Korea; Nokia® of Espoo, Finland; LG® of Seoul, Korea; Motorola® of Schaumburg, Ill.; and Apple® Computer of Cupertino, Calif. A mobile device can include, for example, a display, a processor, a power source (e.g., a battery), a data store, a speaker, memory, a buffer.

Computing device 105 and remote device 110 can communicate by way of network 120. Network 120 can be wired, wireless, or both. Network 120 can be a single network or can include multiple networks. Network 120 may also be a network of networks. Network 120 is shown in more simple form so as to not obscure other aspects of the present invention. For example, network 120 may include one or more wide area networks (WANs), one or more local area networks (LANs), one or more public networks, such as the Internet, or one or more private networks. Network 120 may include an array of devices, which are not shown so as to not obscure more relevant aspects of the invention. In a wireless telecommunications network, components such as a base station, a communications tower, or even access points (as well as other components) can provide wireless connectivity. Although single components are illustrated for clarity, one skilled in the art will appreciate that network 120 can enable communication between any number of devices.

Additionally, remote device 110 may include user 112, user interface 115, object coordinate output 130, object coordinate input 135, application 140, memory 150, and data structure 160. Generally, user interface 115, object coordinate output 130, and object coordinate input 135 provide an input/output (I/O) interface that user 112 may engage to interact with device 110. For example, user interface 115 may include a touch screen that a user may scratch or touch to interact with device 110. This interaction may include inputting an authentication code to object coordinate input 135 in response to presenting a plurality of object coordinates at object coordinate output 130.

Remote device 110 may also include application 140, memory 150, and data structure 160. Application 140 may carry out various functional aspects and might take on a variety of forms. For example, application 140 might include configuration settings, might facilitate communicating data between multiple devices, might handle updates, include user settings, etc. Specifically, application 140 may be used to implement a method for granting access to a component of computing device 105 in response to receiving input based on a presentation of a plurality of object coordinates on a screen of remote device 110.

Memory 150 may include a data structure 160 that stores and facilitates the operation of application 140. For example, memory 150 may store data relating to interactions between user 112 and user interface 115, as well as information related to the presentation of a plurality of object coordinates. In addition, memory 150 may store firmware and other various software modules and components that might be present in remote device 110. Other examples of illustrative software include things such as the operating system of a phone, third-party applications, ring tones, location-based services, contact information, and the like. In sum, FIG. 1 is not meant to indicate all, or even major, systems or components of remote device 110. An overview of remote device 110 is presented and certain components are listed so as to be able to refer to them throughout this disclosure.

Figure 2:
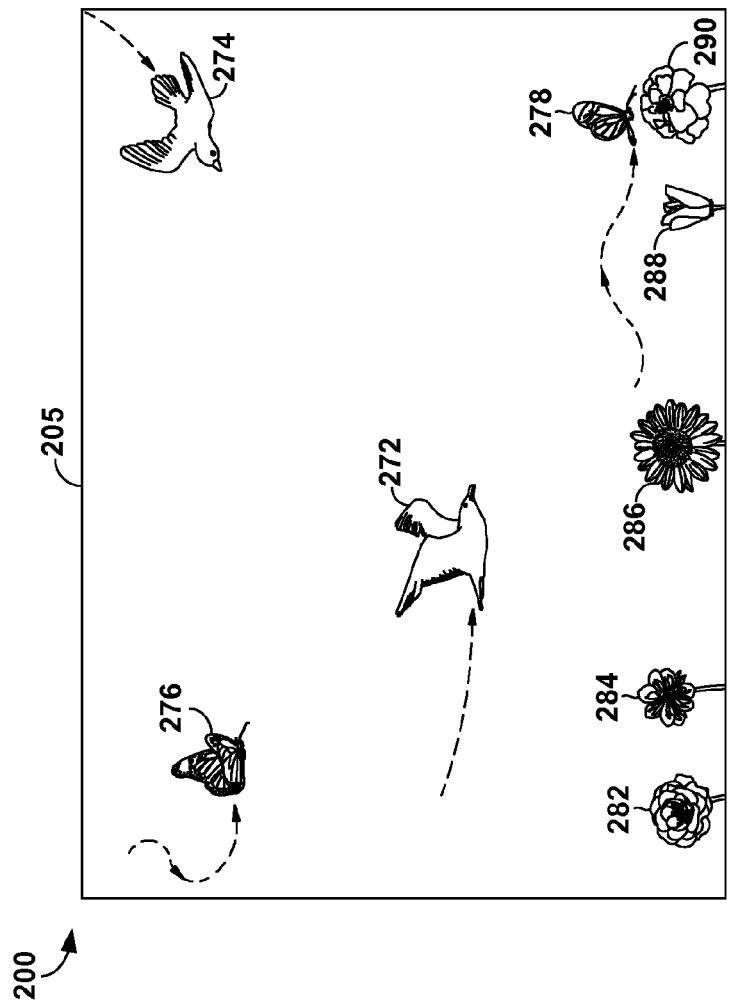
FIG. 2 is a schematic diagram of an arrangement of objects at a first position, in accordance with an embodiment of the present invention.

FIG. 2 is a schematic diagram of an arrangement 200 of objects at a first position 205, in accordance with an embodiment of the present invention. In particular, arrangement 200 includes dynamic objects 272, 274, 276, and 278; and static objects 282, 284, 286, 288, and 290. Each of the dynamic objects and static objects may be mapped to at least one key of a keyboard. Accordingly, in embodiments of the present invention, access to a component of a computing device may be dependent upon entering relational information about two or more objects within arrangement 200. For example, birds 272 and 274 may be mapped to keys "A" and "B," respectively, while butterflies 276 and 278 may be mapped to keys "C" and "D," respectively. As such, keys A-D are object coordinates of objects 272, 274, 276, and 278. Further, flowers rose 282, flower 284, daisy 286, tulip 288, and hydrangea 290 may be mapped to keys "E," "F," "G," "H," and "I," respectively.

In embodiments of the present invention, a reference of each key associated with each object in arrangement 200 may be provided to a remote device. Additionally, references of each key associated with each object in arrangement 200 may be synchronized with arrangement 200 using a token-based system. In further embodiments of the present invention, only a portion of the object coordinates are provided to the remote device. As such, at a first position, keys A-D may be provided to the remote device as being associated with dynamic objects 272, 274, 276, and 278. An exemplary authentication code associated with arrangement 200 may include reference to a bird in relation to a daisy and a butterfly in relation to a rose. Accordingly, using the mappings listed above, four inputs are accurate based on a first position 205 of arrangement 200. In particular, inputs "A-G-C-E," "A-G-D-E," "B-G-C-E," and "B-G-D-E" are accurate inputs that may be entered as authentication codes. As such, requirements of an authentication code may be met by more than one set of inputs.

Figure 3:
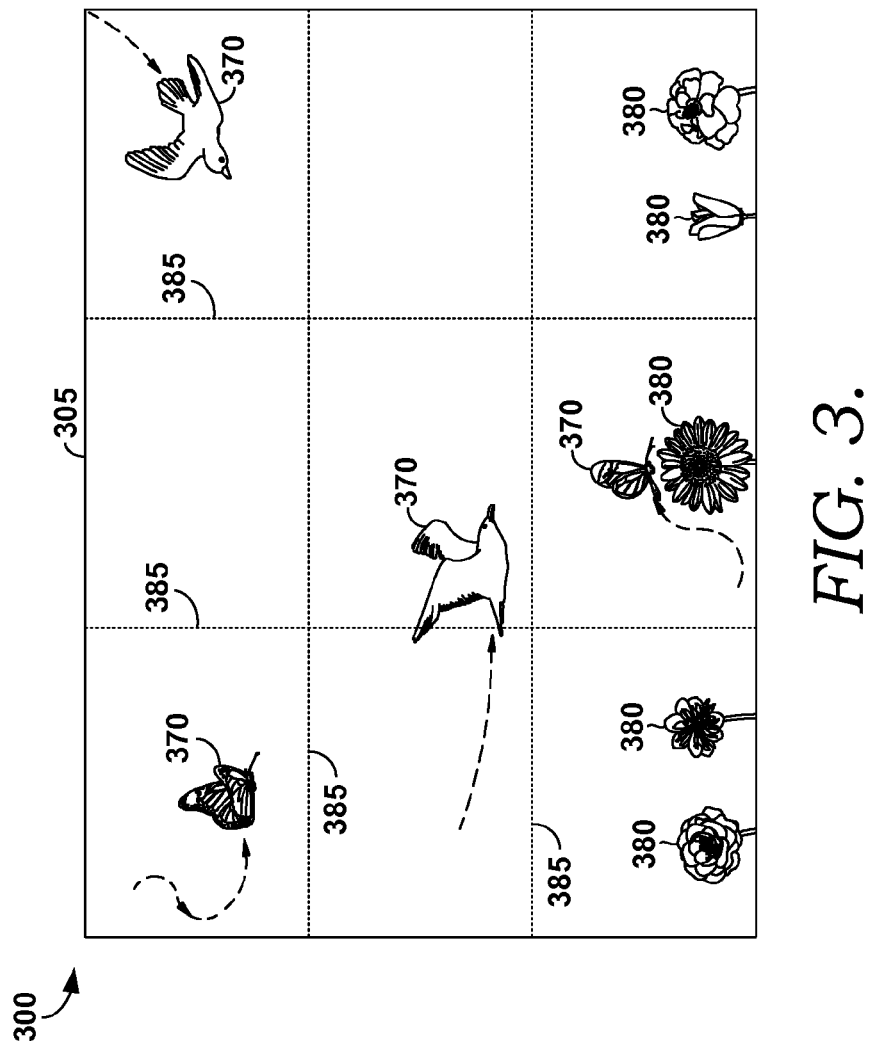
FIG. 3 is a schematic diagram of an arrangement of objects including graphical axes, the arrangement of objects at a first position, in accordance with an embodiment of the present invention.
Figure 4:
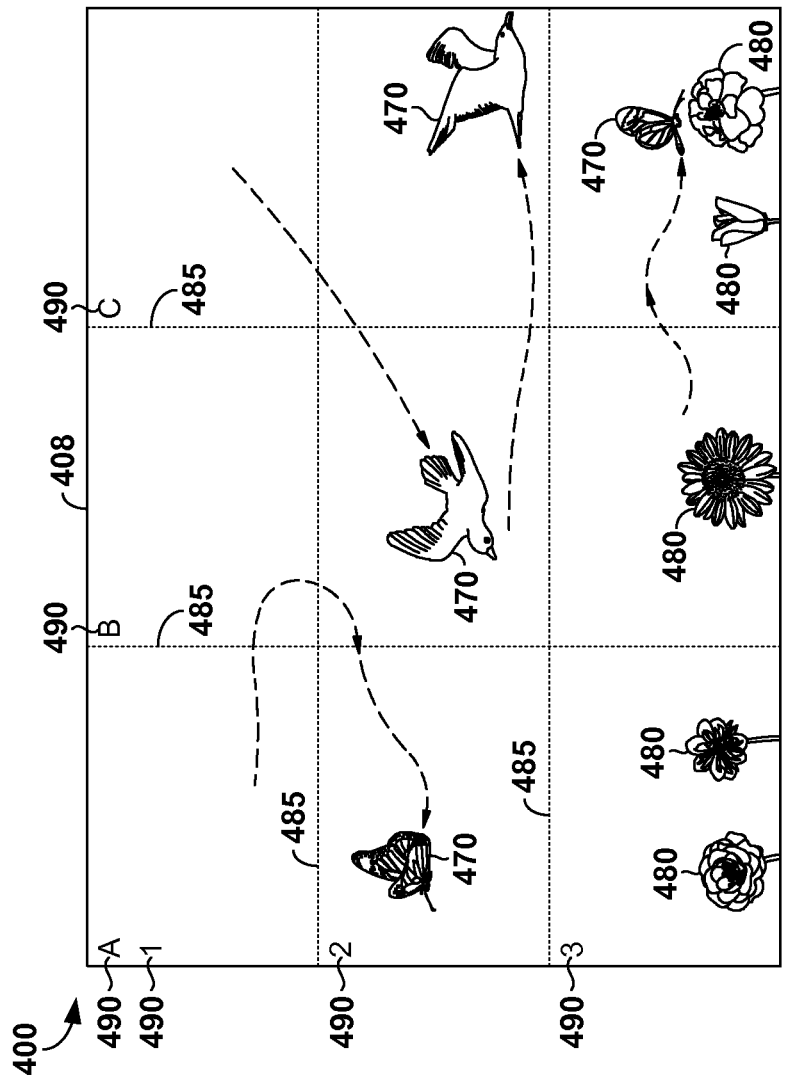
FIG. 4 is a schematic diagram of an arrangement of objects including graphical axes, the arrangement of objects at a second position, in accordance with an embodiment of the present invention.

As seen in FIG. 2, embodiments of the present invention may include arrangements of objects without reference to grid lines and graphical axes. In particular, embodiments of the invention may include reference to keys of a keyboard. In further embodiments, such as seen in FIG. 3, arrangements of objects may include grid lines and graphical axes. As such, FIG. 3 is a schematic diagram of an arrangement 300 of objects at a first position 305, the arrangement 300 including graphical axes 385, in accordance with an embodiment of the present invention. In particular, arrangement 300 includes dynamic objects 370, static objects 380, and graphical axes 385. In addition to embodiments that include grids and graphical axes, additional embodiments of the present invention may also include graphical axis identifiers. As such, FIG. 4 is a schematic diagram of an arrangement 400 of objects at a second position 408, the arrangement 400 including graphical axes 485 and graphical axis identifiers 490, in accordance with an embodiment of the present invention. Additionally, arrangement 400 includes dynamic objects 470 and static objects 480. The use of graphical axis identifiers 490 may help a user to better reference the spatial relationships between objects of arrangement 400, such as dynamic objects 470 and static objects 480.

Figure 5:
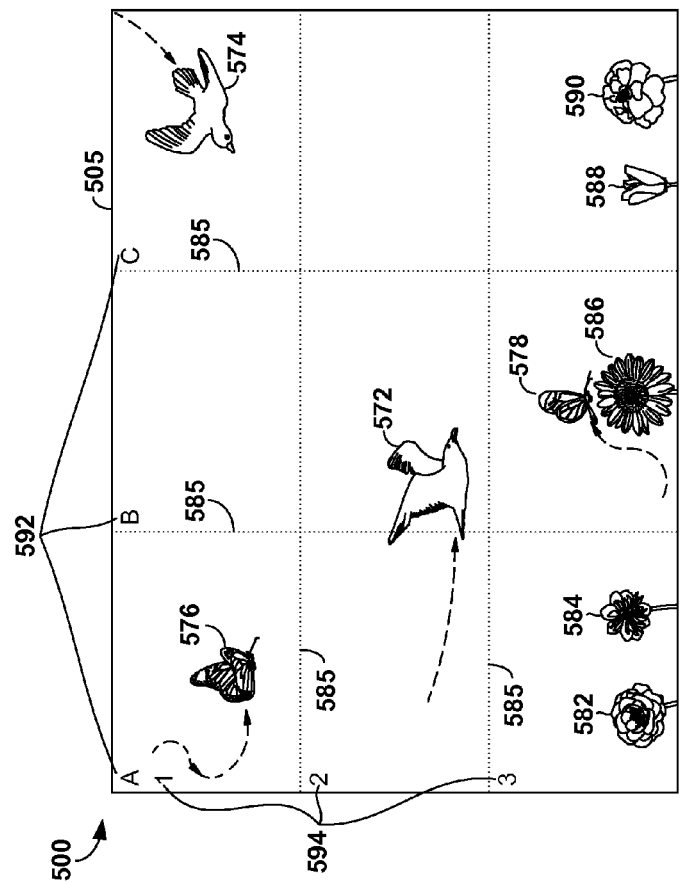
FIG. 5 is a schematic diagram of an arrangement of objects at a first position, the arrangement including graphical axes and graphical axis identifiers, in accordance with an embodiment of the present invention.

FIG. 5 provides graphical identifiers used to reference individual squares of a grid in accordance with an exemplary embodiment of the present invention. As such, FIG. 5 is a schematic diagram of an arrangement 500 of objects at a first position 505, the arrangement 500 including graphical axes 585 and graphical axis identifiers 592 and 594, in accordance with an embodiment of the present invention. Additionally, FIG. 5 includes dynamic objects 572, 574, 576, and 578; and static objects 582, 584, 586, 588, and 590. Each of the dynamic objects and static objects may be mapped to at least one set of graphical coordinates. Further, a portion of object coordinates associated with dynamic objects 572, 574, 576, and 578 may be provided to a remote device.

Accordingly, in embodiments of the present invention, access to a component of a computing device may be dependent upon entering coordinate-based relationship information relating two or more objects within arrangement 500. For example, birds 572 and 574 may be mapped to coordinates "B2" and "C1," respectively, while butterflies 576 and 578 may be mapped to keys "A1" and "B3," respectively. Further, flowers rose 582, flower 584, daisy 586, tulip 588, and hydrangea 590 may be mapped to keys "A3," "A3," "B3," "C3," and "C3," respectively. As such, one authentication code associated with arrangement 500 may include reference to a first relationship of a bird, such as bird 572, in relation to a daisy and a second relationship of a butterfly, such as butterfly 578, in relation to a rose. Accordingly, using the mappings listed above, one set of inputs is accurate based on a first position 505 or arrangement 500.

Figure 6:
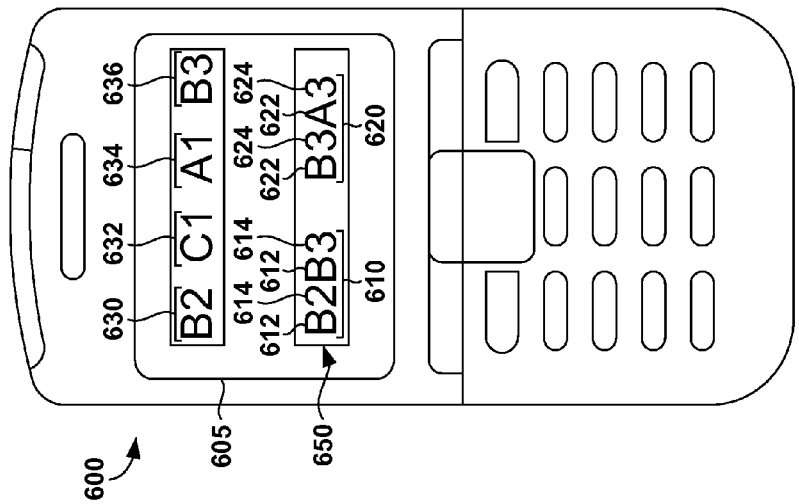
FIG. 6 is a schematic diagram of a remote device associated with FIG. 5, in accordance with an embodiment of the present invention.

FIG. 6 is a schematic diagram of a remote device 600 associated with FIG. 5, in accordance with an embodiment of the present invention. In particular, FIG. 6 provides a plurality of object characteristics 630, 632, 634, and 636 presented on screen 605. Object characteristics 630, 632, 634, and 636 are associated with dynamic objects within arrangement 500. Additionally, FIG. 6 includes authentication code inputs. Authentication code inputs include "B2-B3" to indicate first relationship 610. In particular, first relationship 610 inputs include column identifiers 612 and row identifiers 614. Additionally, authentication code inputs also include "B3-A3" to indicate second relationship 620. In particular, second relationship 620 inputs include column identifiers 622 and row identifiers 624.

FIG. 7 is a schematic diagram of an arrangement 700 of objects at a second position 708, the arrangement 700 including graphical axes 785 and graphical axis identifiers 792 and 794, in accordance with an embodiment of the present invention. Additionally, FIG. 7 includes dynamic objects 772, 774, 776, and 778; and static objects 782, 784, 786, 788, and 790. Each of the dynamic objects and static objects may be mapped to at least one set of graphical coordinates. Further, a portion of object coordinates associated with dynamic objects 772, 774, 776, and 778 may be provided to a remote device.

Accordingly, in embodiments of the present invention, access to a component of a computing device may be dependent upon entering coordinate-based location information relating two or more objects within arrangement 700. For example, birds 772 and 774 may be referenced by coordinates "C2" and "B2," respectively, while butterflies 776 and 778 may be referenced by coordinates "A2" and "C3," respectively. Further, flowers rose 782, flower 784, daisy 786, tulip 788, and hydrangea 790 may be referenced by coordinates "A3," "A3," "B3," "C3," and "C3," respectively. As such, one authentication code associated with arrangement 700 may include reference to a first relationship of a bird, such as bird 772, in relation to a daisy and a second relationship of a butterfly, such as butterfly 778, in relation to a rose. Accordingly, using the mappings listed above, one set of inputs is accurate based on a second current screen presentation 708.

FIG. 8 is a schematic diagram of a remote device 800 associated with FIG. 7, in accordance with an embodiment of the present invention. In particular, FIG. 8 provides a plurality of object characteristics 830, 832, 834, and 836 presented on screen 805. FIG. 8 also provides authentication code inputs that include "C2-B3" to indicate first relationship 810. First relationship 810 inputs include column identifiers 812 and row identifiers 814. Additionally, authentication code inputs include "C3-A3" to indicate second relationship 820. In particular, second relationship 820 inputs include column identifiers 822 and row identifiers 824.

Figure 9:
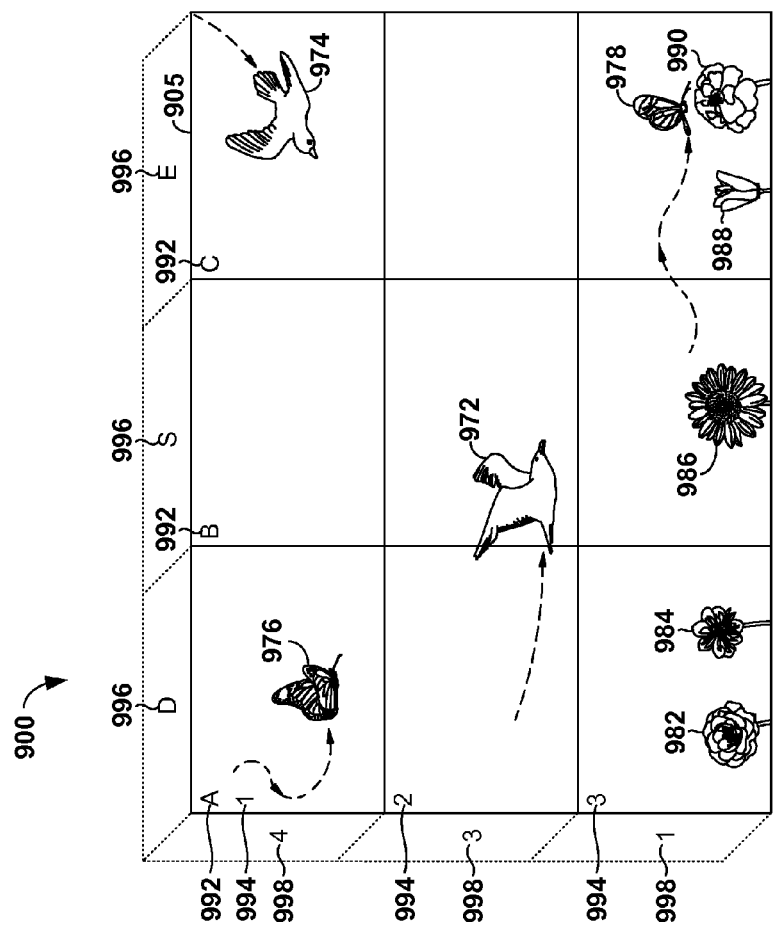
FIG. 9 is a schematic diagram of another arrangement of objects at a first position, the arrangement including graphical axes and graphical axis identifiers, in accordance with an embodiment of the present invention.

FIG. 9 is a schematic diagram of an arrangement 900 of objects at a first current position 905, arrangement 900 including graphical axis identifiers 992, 994, 996, and 998, in accordance with an embodiment of the present invention. In particular, graphical axis identifiers 992 and 994 and associated with object coordinates provided to a remote device to be presented to a user, while graphical axis identifiers 996 and 998 are associated with inputs received from the remote device. As such, the accuracy of an authentication code received from the remote device will be assessed based on graphical axis identifiers 996 and 998. Additionally, FIG. 9 includes dynamic objects 972, 974, 976, and 978; and static objects 982, 984, 986, 988, and 990. Each of the dynamic objects and static objects may be mapped to at least one set of graphical coordinates. Further, the object coordinates of 972, 974, 976, and 978 may be provided to the remote device, while object coordinates 982, 984, 986, 988, and 990 may be known to the user.

Accordingly, in embodiments of the present invention, access to a component of a computing device may be dependent upon entering coordinate-based location information relating two or more objects within arrangement 900. For additional security, however, the graphical axis identifiers 992 and 994 that are used to reference objects coordinates provided to a remote device may differ from the graphical axis identifiers 996 and 998 that are used to input object coordinates associated with an authentication code. For example, the object coordinates of birds 972 and 974 may be provided to the remote device as object coordinates "B2" and "C1," but they may be input as part of an authentication code using object coordinates "S3" and "E4," respectively. Further, while butterflies 976 and 978 may be provided to the remote device as object coordinates "A1" and "C3," but they may be input as part of an authentication code using object coordinates "D4" and "E1," respectively. Further, flowers rose 982, flower 984, daisy 986, tulip 988, and hydrangea 990, which are known to the user associated with the remote device, may be referred to by object coordinates "D1," "D1," S1," "E1," and "E1," respectively. As such, one authentication code associated with arrangement 900 may include reference to a first relationship of a bird, such as bird 972, in relation to a daisy and a second relationship of a butterfly, such as butterfly 978, in relation to a rose. Accordingly, using the mappings listed above, one set of inputs is accurate based on first current screen presentation 905.

Figure 10:
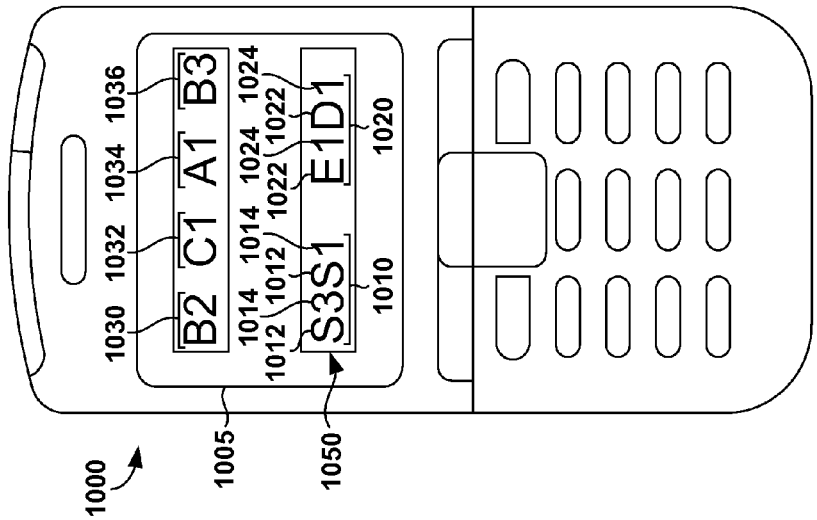
FIG. 10 is a schematic diagram of a remote device associated with FIG. 9, in accordance with an embodiment of the present invention.

FIG. 10 is a schematic diagram of a remote device 1000, in accordance with an embodiment of the present invention. In particular, FIG. 10 provides a plurality of object characteristics 1030, 1032, 1034, and 1036 presented on screen 1005. FIG. 10 also provides authentication code inputs that include "S3-S1" to indicate first relationship 1010. First relationship 1010 inputs include column identifiers 1012 and row identifiers 1014. Additionally, authentication code inputs include "E1-D1" to indicate second relationship 1020. In particular, second relationship 1020 inputs include column identifiers 1022 and row identifiers 1024.

Figure 11:
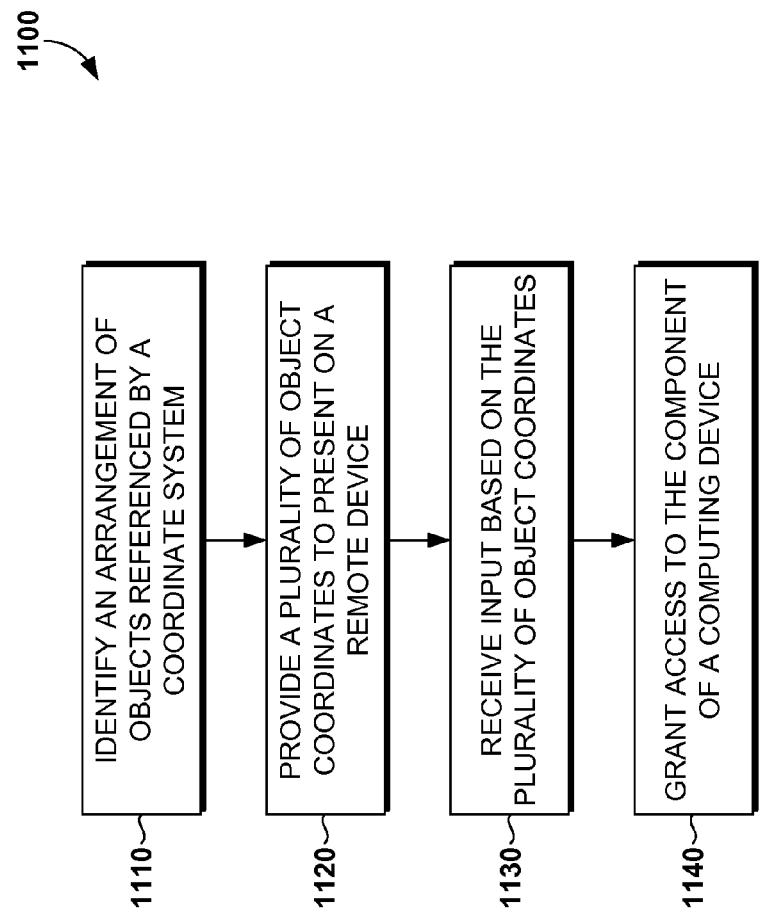
FIG. 11 is a flow diagram showing a method of granting access to a component of a computing device in response to receiving, from a remote device, input based on a presentation of a plurality of object coordinates on a screen of the remote device, in accordance with an embodiment of the present invention.

FIG. 11 is a flow diagram 1100 showing a method of granting access to a component of a computing device in response to receiving, from a remote device, input based on a presentation of a plurality of object coordinates on a screen of the remote device, in accordance with an embodiment of the present invention. At block 1110, an arrangement of objects that are referenced by a coordinate system is identified. The arrangement of objects may include a presentation of images on a screen of the computing device. Further, the presentation of images on the screen of the computing device may be dynamic. At block 1120, a plurality of object coordinates are provided to the remote device. The object coordinates are defined by the coordinate system. Further, the object coordinates are provided to be presented on the screen of the remote device. Additionally, each object coordinate is based on the arrangement of objects. In particular, each object coordinate of the plurality of object coordinates may be based on a dynamic object within the arrangement of objects. At block 1130, input that is based on the plurality of object coordinates presented on the screen of the remote device is received. The input is received at the computing device. In embodiments, the input illustrates location-based relationships between the object coordinates of the plurality of object coordinates. Further, the accuracy of the input may be assessed based on location-based relationships between the objects coordinates of the plurality of object coordinates. At block 1140, access to the component of the computing device is granted when the input provided is accurate based on the arrangement of objects. In embodiments, the computing device may be a secured device. Additionally, the remote device may be a mobile device.

Figure 12:
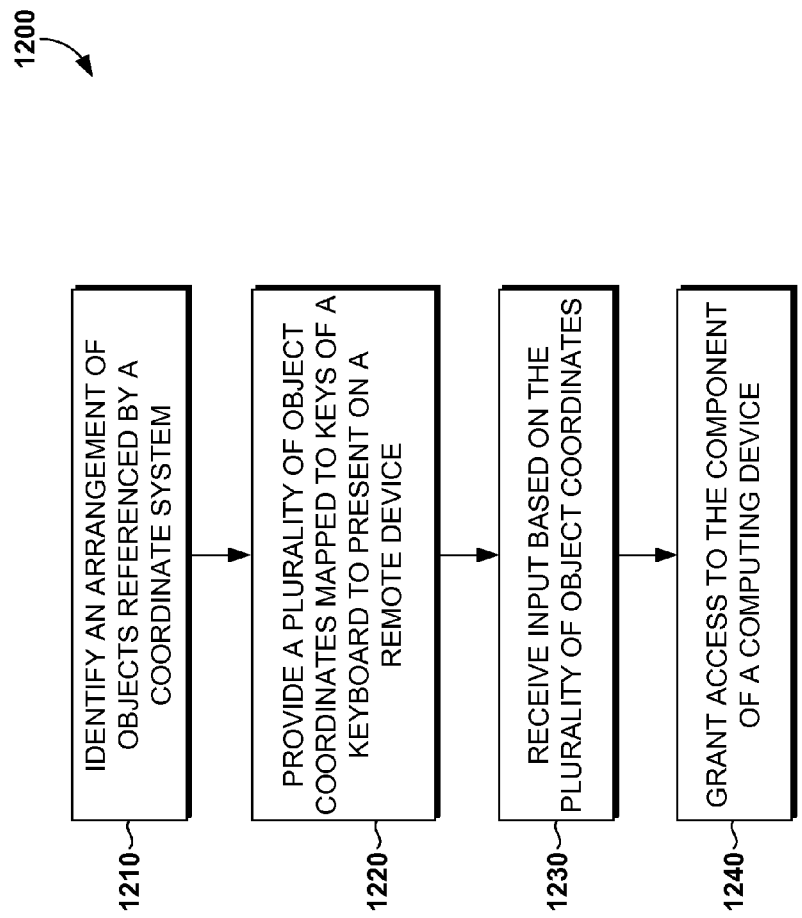
FIG. 12 is another flow diagram showing a method of granting access to a component of a computing device in response to receiving, from a remote device, input based on a presentation of a plurality of object coordinates on a screen of the remote device, in accordance with an embodiment of the present invention.

FIG. 12 is another flow diagram 1200 showing a method of granting access to a component of a computing device in response to receiving, from a remote device, input based on a presentation of a plurality of object coordinates on a screen of the remote device, in accordance with an embodiment of the present invention. At 1210, an arrangement of objects that are referenced by a coordinate system is identified. Additionally, at block 1220, a plurality of object coordinates is provided to the remote device. The object coordinates are defined by the coordinate system. Further, the object coordinates are provided to be presented on the screen of the remote device. Additionally, each object coordinate is based on the arrangement of objects and, further, each object coordinate is mapped to at least one key of the keyboard. At block 1230, input that is based on the plurality of object coordinates presented on the screen of the remote device is received. The input is received at the computing device. In embodiments, the input may include graphical coordinates of the objects referenced in the plurality of object coordinates. Additionally, the input includes the at least one key associated with each object coordinate of the plurality of object coordinates. At block 1240, access to the component of the computing device is granted when the input provided is accurate based on the arrangement of objects. In embodiments, the component may be a login screen.

In further embodiments, a second input may be received from the remote device. The second input may be based on spatial relationships between object coordinates of the plurality of object coordinates as presented on the screen of the remote device. Further, access to a second component of the computing device may be granted when the second input is inaccurate based on the arrangement of objects. In embodiments, the second component may be a false login screen. Additionally, the computing device may be a secured device. Also, the remote device may be a mobile device.

Figure 13:
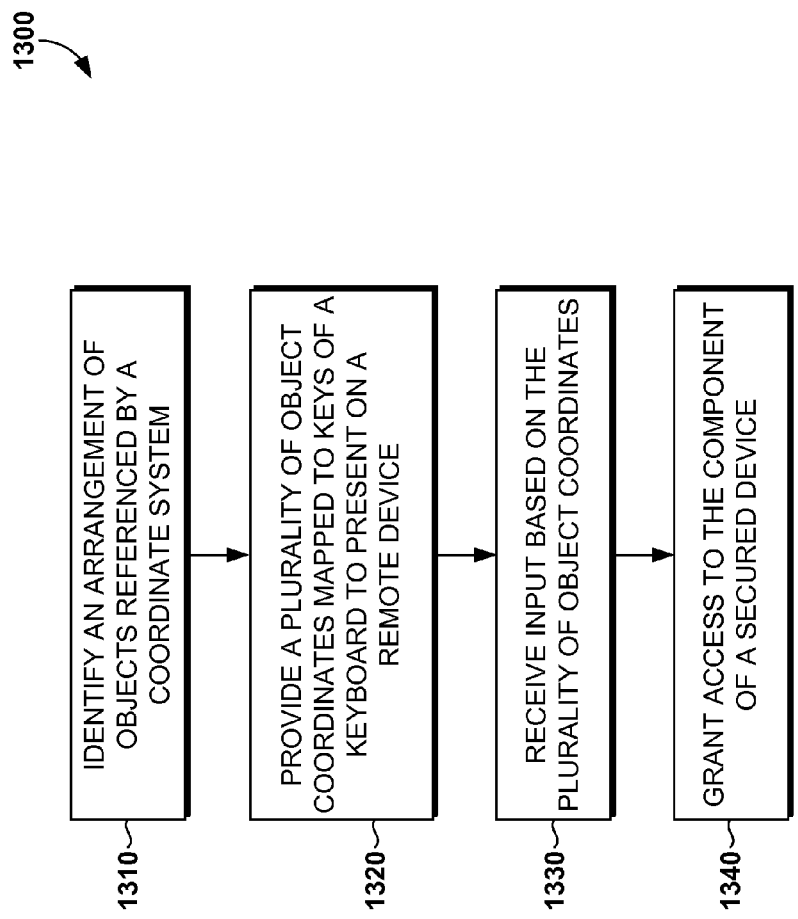
FIG. 13 is a flow diagram showing a method of granting access to a component of a secured device in response to receiving, from a remote device, input based on a presentation of a plurality of object coordinates on a screen of the remote device, in accordance with an embodiment of the present invention.

FIG. 13 is another flow diagram 1300 showing a method of granting access to a component of a secured device in response to receiving, from a remote device, input based on a presentation of a plurality of object coordinates on a screen of the remote device, in accordance with an embodiment of the present invention. At 1310, an arrangement of objects that are referenced by a coordinate system is identified. Additionally, at block 1320, a plurality of object coordinates is provided to the remote device. The object coordinates are defined by the coordinate system. Further, the object coordinates are provided to be presented on the screen of the remote device. Additionally, each object coordinate is based on the arrangement of objects and, further, each object coordinate is mapped to at least one key of the keyboard. At block 1330, input that is based on the plurality of object coordinates presented on the screen of the remote device is received. The input is received at the secured device. Additionally, the input includes the at least one key associated with each object coordinate of the plurality of object coordinates. At block 1340, access to the component of the secured device is granted when the input provided is accurate based on the arrangement of objects. In embodiments, each graphical indicator of each graphical axis may correspond to the at least one key mapped to the graphical axis. Alternatively, each graphical indicator of each graphical axis may differ from the at least one key mapped to the graphical axis. Additionally, the remote device may be a mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of granting access to a component of a computing device in response to receiving, from a remote device, input based on a presentation of a plurality of object coordinates on a screen of the remote device, the method comprising:

identifying an arrangement of objects that are referenced by a coordinate system;

providing, to the remote device, a plurality of object coordinates, as defined by the coordinate system, to be presented on the screen of the remote device, wherein each object coordinate of the plurality of object coordinates is based on the arrangement of objects, the arrangement of objects including a dynamic object;

receiving, at the computing device, input that is based on the plurality of object coordinates presented on the screen of the remote device, wherein the input illustrates a location-based relationship between the object coordinates of the plurality of object coordinates and the arrangement of objects and wherein the remote device is a mobile device; and granting access to the component of the computing device when the input provided is accurate based on the arrangement of objects.

2. The computer-readable media of claim 1, wherein the arrangement of objects comprises a presentation of images on a screen of the computing device.

3. The computer-readable media of claim 1, wherein the computing device is a secured device.

4. The computer-readable media of claim 1, wherein the accuracy of the input is assessed based on location-based relationships between the object coordinates of the plurality of object coordinates.

5. The computer-readable media of claim 2, wherein the presentation of images on the screen of the computing device is dynamic.

6. The computer-readable media of claim 5, wherein the plurality of object coordinates provided to the remote device are updated based on the dynamic presentation of images on the screen of the computing device.

7. Non-transitory computer-readable media having computer-executable instructions embodied thereon that, when executed, facilitate a method of granting access to a component of a computing device in response to receiving, from a remote device, input based on a presentation of a plurality of object coordinates on a screen of the remote device, the method comprising:

identifying an arrangement of objects that are referenced by graphical axes of a coordinate system;

providing, to the remote device, a plurality of object coordinates to be presented on the screen of the remote device, wherein each object coordinate of the plurality of object coordinates is based on the arrangement of objects, and wherein each object coordinate is mapped to at least one key of the keyboard, wherein the arrangement of objects includes a dynamic object;

receiving, at the computing device, input that is based on the plurality of object coordinates presented on the screen of the remote device, wherein the input comprises the at least one key associated with each object coordinate of the plurality of object coordinates, wherein the input illustrates a location-based relationship between the object coordinates of the plurality of object coordinates and the arrangement of objects and wherein the remote device is a mobile device; and granting access to the component of the computing device when the input provided is accurate based on the arrangement of objects.

8. The computer-readable media of claim 7, wherein the input comprises graphical coordinates of the objects of the plurality of object coordinates.

9. The computer-readable media of claim 7, wherein the component is a login screen.

10. The computer-readable media of claim 7, further comprising:

receiving a second input by way of the remote device, wherein the second input is based on spatial relationships between object coordinates of the plurality of object coordinates as presented on the screen of the remote device; and granting access to a second component of the computing device when the second input provided is inaccurate based on the arrangement of objects.

11. The computer-readable media of claim 10, wherein the component is a false login screen.

12. The computer-readable media of claim 7, wherein the computing device is a secured device.

13. A method of granting access to a component of a secured device in response to receiving, from a remote device, input based on a presentation of a plurality of object coordinates on a screen of the remote device, the method comprising:

identifying an arrangement of objects that are referenced by graphical axes of a coordinate system;

providing, to the remote device, a plurality of object coordinates to be presented on the screen of the remote device, wherein each object coordinate of the plurality of object coordinates is based on the arrangement of objects, wherein each object coordinate is mapped to at least one key of the keyboard, and wherein the arrangement of objects includes a dynamic object;

receiving, at the secured device, input that is based on the plurality of object coordinates presented on the screen of the remote device, wherein the input comprises the at least one key associated with each object coordinate of the plurality of object coordinates, wherein the input illustrates a location-based relationship between the object coordinates of the plurality of object coordinates and the arrangement of objects and wherein the remote device is a mobile device; and granting access to the component of the secured device when the input provided is accurate based on the arrangement of objects.

14. The method of claim 13, wherein each graphical indicator of each graphical axis corresponds to the at least one key mapped to the graphical axis.

15. The method of claim 13, wherein each graphical indicator of each graphical axis differs from the at least one key mapped to the graphical axis.

* * * * *